United States Patent Office 3,542,700
Patented Nov. 24, 1970

3,542,700
PROCESS OF MAKING A RUBBER LATEX COMPOSITION; THE SHAPED VULCANIZED COMPOSITION; THE FOAMED COMPOSITION THEREFROM
George Hilditch, Frank Laidlaw White, and Raymond Almer Stewart, Sarnia, Ontario, Canada, assignors to Polymer Corporation Limited, Sarnia, Ontario, Canada, a body corporate and politic
No Drawing. Filed Oct. 18, 1965, Ser. No. 497,459
Claims priority, application Canada, June 21, 1965, 933,823
Int. Cl. C08d 7/00, 7/16, 13/08
U.S. Cl. 260—2.5       18 Claims

ABSTRACT OF THE DISCLOSURE

Latex blends of a hydrocarbon polymer and a copolymer of isoprene and an acrylic nitrile are used to produce elastic shaped articles of improved tensile properties by a process involving shaping the latex blends, gelling to preserve shape and vulcanizing.

---

The invention relates to aqueous dispersions of elastomeric materials. In particular, it relates to blends of rubber latices having improved properties, and to rubber products produced therefrom.

It is known that rubbery compositions prepared from natural rubber latex have excellent stress-strain properties seldom achieved with synthetic emulsion polymer latices. Natural rubber latex possesses colloidal properties which are suitable for the preparation of foam rubber: the concentrated latex exhibits low viscosity at high solids contents and may easily be set to an elastic gel having sufficient strength for further processing. Synthetic latices do not possess these desirable properties and accordingly, they are frequently used merely as extenders for natural rubber latex in the production of latex foam rubber and other products.

The object of this invention is to improve the deficient properties of synthetic rubber latex. A further object is to provide a latex composition based on synethetic latices having improved properties. And yet another object of the invention is to prepare latex rubber products based on synthetic latices having improved properties.

It has now been found that a composition of synthetic rubber latices of improved properties may be obtained by blending (1) a hydrocarbon rubber latex, e.g. styrene butadiene rubber latex and (2) a latex of a copolymer of conjugated alkadiene having at least 5 carbon atoms and a non-ionizable derivative of an unsaturated carboxylic acid such as isoprene-acrylonitrile copolymer. This finding is surprising as it is generally believed that such polymers have limited compatibility.

The objects of the invention have been achieved in providing an aqueous dispersion of a synthetic rubber which comprises a latex blend of (1) a hydrocarbon rubber latex and (2) a latex of a copolymer of a mixture comprising a major proportion of a conjugated alkadiene containing at least 5 carbon atoms and a minor proportion of a non-ionizable derivative of an unsaturated carboxylic acid. In one of its specific aspects, the invention has been achieved in providing an aqueous dispersion of a synthetic rubber which comprises a latex blend of (1) a styrene-butadiene rubber latex containing at least 60% of rubber hydrocarbon solids and (2) an isoprene-acrylonitrile copolymer latex, said copolymer containing about 25 to about 50 mole percent of acrylonitrile, the weight ratio of (1) to (2) being between about 90/10 and 40/60 on a dry weight basis.

A further object of the invention has been achieved in providing a process of producing shaped elastic composition which comprises blending (1) a synthetic latex of a hydrocarbon rubber, said latex having at least 60% solids content, and (2) a latex of a copolymer of a mixture comprising isoprene and a non-ionizable derivative of an unsaturated carboxylic acid, the molar proportion of said isoprene to said derivative being between 1:1 and 5:1, the blend of (1) and (2) having at least 58% solids and being pourable, shaping the blend to a predetermined form, gelling and vulcanizing.

The composition according to the invention consists of two essential components. The first component is a hydrocarbon rubber latex. Any hydrocarbon rubber latex can be used, although it is preferred to use a latex of a polymer or copolymer of an aliphatic conjugated diene containing 4–10 carbon attoms such as butadiene-1,3 and hydrocarbon substituted butadiene-1,3. Examples of commercially produced hydrocarbon rubbery polymers are polybutadiene, butadienestyrene rubbers containing less than 50 percent by weight of styrene, polyisoprene, isoprene-styrene copolymers containing less than 50 percent by weight of styrene. Other copolymerizable hydrocarbon monomers such as alpha methylstyrene, isobutylene, cyclopentadiene can be used instead of, or in addition to, styrene.

The hydrocarbon rubber latices can be prepared from rubber solutions in hydrocarbon solvent by dispersing them in aqueous soap solutions, stripping off the solvent and evaporating exess of water. Preferably, however, the hydrocarbon rubber latices are prepared by emulsion polymerization. The techniques of emulsion polymerization are well known in the art and an example is given as Latex A in Example I of this specification. It is understood, however, that the method of producing the hydrocarbon rubber latex is not restricted to that shown in the specific example.

The hydrocarbon rubber latex which preferably is used is a latex having an average particle size of a least 1000 angstroms and preferably at least 1500 angstroms. It may be produced by agglomerating a small size particle latex using a variety of techniques such as a freeze-thaw agglomeration process or a process in which the latex is forced through a constriction under a high pressure. Both processes are known in the art. Water may be then removed from the agglomerated latex by evaporation until a solids content of at least 60 percent is achieved.

The second component of the blend according to the invention is polar copolymer latex formed by copolymerization of a conjugated alkadiene and a polar comonomer. The alkadiene preferably contains at least 5 carbon atoms and not more than 10 carbon atoms. Representative examples of the alkadiene are isoprene, piperylene, 2,3-dimethyl butadiene-1,3, 2-ethyl butadiene, 2-amyl butadiene-1,3, octadiene-1,3, decadiene-1,3. Alkadienes containing 5 carbon atoms are preferred and isoprene is the most preferred alkadiene. The polar comonomer which is copolymerized with the conjugated alkadiene is an ethylenically unsaturated compound having at least one non-ionizable polar group selected from cyanide, amide or carbalkoxide groups. The unsaturation may be of the vinyl, vinylidene or vinylene type. The unsaturated compound of this type is considered herein to be non-ionizable derivative such as nitrile, amide or alkyl ester of an unsaturated carboxylic acid. It is preferred to use a polar comonomer having not more than 12 carbon atoms and being a derivative of an unsaturated monocarboxylic acid containing 3–6 carbon atoms such as acrylic acid and alkyl substituted acrylic acids. Representative examples of the polar comonomer are acrylonitrile, methacrylonitrile, crotononitrile, allyl cyanide, methyl acrylate, butyl acrylate, octyl acrylate, methyl methacrylate, acrylamide, methacrylamide. Nitriles of unsubstituted and alkyl substituted acrylic acids are preferred and acrylonitrile is the most preferred polar comonomer.

The proportion of the alkadiene to the polar comonomer in the copolymer may vary between 5:1 and 1:1, on a molar basis. It is preferred to use a copolymer containing at least 25 mole percent and not more than 50 mole percent of the polar comonomer. Best results, however, are obtained with a copolymer in which the polar comonomer is present in an amount between about 30 and about 45 mole percent. In addition to the alkadiene and polar comonomer or comonomers, other monomers such as butadiene-1,3, styrene, alpha methyl styrene, vinyl pyridine, may be present, if special effects are desired. The other monomer, if present, does not exceed 20 percent by weight of the total copolymer. The molecular weight of the polar copolymer is not critical and may vary within wide limits of Mooney viscosities (ML-4 at 100° C.) from about 20 to about 150. It is preferred to use the higher molecular weight copolymers having a Mooney viscosity (ML-4 at 100° C.) of at least 50 and preferably at least 70.

The polar copolymer is prepared by polymerizing a mixture of monomers comprising the alkadiene and the polar comonomer, both as herein above defined, in an emulsion polymerization system using techniques well known in the art. An example is given as Latex B in Example I of this application. It is understood, however, that the composition of the latex or the method of producing is not restricted to that shown in Example I. It is desirable to use as the second component of the blend a latex of the polar copolymer of a solids content as high as possible. For this reason, the alkadiene and the polar comonomer are preferably copolymerized in the presence of a substantial amount of a seed latex. The seed latex suitably is a latex of a conjugated diolefin polymer. Preferably, it is a copolymer latex of a diolefin such as butadiene or isoprene with a comonomer, preferably polar comonomer as hereinbefore defined. For example, it may be a butadiene-acrylonitrile, isoprene-acrylonitrile or isoprene-methyl methacrylate latex containing at least 30% and preferably at least 40% solids. The seed latex is used in an amount varying between about 5 and 50 parts of latex solids per 100 parts of total monomers and the preferred amount is about 20 to about 50 parts. It is also advisable to initiate the polymerization in the presence of the seed latex and the minimum amount of emulsifiers. As the polymerization reaction proceeds further amounts of the emulsifier may be added as required at conversions of about 15 percent or more to maintain a stable emulsion. The resulting latex has an average particle size of about 1000 angstroms to about 1300 angstroms and can be concentrated to a fluid latex of at least about 50% solids.

The two components of the blend of this invention may be admixed in a proportion varying between 95/5 and 10/90 on a dry weight basis of the hydrocarbon rubber latex and the polar copolymer latex respectively. Blends containing a major proportion of the polar copolymer latex and a minor proportion of the hydrocarbn latex are preferred where oil resistance is essential. Suitable blends of this kind contain about 50-80 percent by weight of the polar copolymer latex solids and about 50-20 percent by weight of the hydrocarbon rubber latex solids. When, on the other hand, it is desired to improve stress-strain properties of the hydrocarbon rubber latex, then blends containing a minor proportion of the polar copolymer latex are used. For example, in foam rubber compositions, the addition of the polar copolymer latex to the hydrocarbon rubber latex to give a proportion of about 20-40 percent of the polar copolymer latex solids on total latex solids of the blend results in an improved latex gel strength and cured foam strength.

The above latex blends may be used without the addition of any extraneous materials. Gelation or fusing of particles may be achieved by drying the blend at room temperature or at an elevated temperature. Cross-linking may be induced by irradiation with gamma rays or X-rays or by heat treatment in the presence of air. However, for most applications, it is preferred to mix the latex blend with various compounding ingredients which improve the processability or the properties of the final product. The ingredients normally used are stabilizers, thickeners, curatives, antioxidants, fillers, all well known in the art of latex compounding.

The compounding ingredients are added in the form of liquid or fine powder as the case may be, but preferably in the form of an aqueous dispersion. The latex blend and the ingredients are thoroughly mixed and the mixture may be used immediately or after a period of maturing. Maturing is usually done at room temperature for a period of ½ to 24 hours. Next the compounded latex composition is shaped to a predetermined form before it is gelled. The methods of shaping, gelling and curing may vary depending on the final product. In the production of latex thread, the latex composition is forced through a small orifice where it obtains a filamentary shape and immediately thereafter it is gelled and cured. In the production of dipped goods, the latex composition is deposited on a support having a predetermined shape, then gelled by dipping in a coagulant and cured. In the production of latex foam goods, the compounded latex composition is first whipped to a uniform foam, then treated with a delayed action gelling agent, shaped and gelled so that the shape is retained; gelled structure is cured and washed to produce a latex foam having a density of about 0.05 to 0.3 gms./cm.$^3$. The amount of the gelling agent and/or conditions of the reaction are selected so that the gelation time is as required for a particular process.

Vulcanization of shaped and gelled composition is accomplished by conventional techniques. Such composition may be heated at a vulcanization temperature of about 80 to 180° C. preferably 100 to 160° for a time period varying from about 5 to about 180 minutes, then washed with water to remove soluble components. Other methods of crosslinking polymeric chains of gelled composition such as irradiation can also be used if desired. However, the sulfur vulcanization is most preferred. The methods of gelling and vulcanizing latex compositions are known and do not constitute the subject matter of this invention.

The cured latex compositions according to the present invention provide latex foam and film structures having improved properties. In addition to having better strength in the gel stage which is important in the process stages where gel is mechanically handled, the structures of this invention have good tensile strength and elongation, good oil and age resistance.

Having described the invention in general terms, it is further illustrated by the following examples in which a hydrocarbon rubber latex is blended with a latex of a polar copolymer and the blend is further processed to produce compositions and structures of the invention.

EXAMPLE I

Two latex blends, Blend I and Blend II, were prepared by admixing Latex A and Latex B in different proportions.

Latex A was a 67% solids latex of a butadiene styrene copolymer containing 23% by weight of bound styrene. It was prepared by polymerizing a mixture of 73 parts by weight of butadiene-1,3 and 27 parts by weight of styrene in an aqueous solution of potassium oleate. The polymerization reaction was initiated and carried to a conversion of 72% in the presence of a redox catalyst system consisting of 0.1 part of diisopropyl benzene monohydroperoxide and 0.046 part of a complex sodium salt of ferrous sulfoxylate. The latex was degassed, the unreacted monomers were removed by stripping and the latex was then subjected to a freeze and thaw process whereby latex particles agglomerated. The latex was then concentrated by evaporating excess water to produce a 67% solids latex which had an average latex particle size of 1600 angstroms as determined by electron microscope and a viscosity of 12 poise at 25° C. as measured in Brookfield LVF viscometer using #3 spindle at 30 r.p.m.

Latex B was prepared by copolymerizing isoprene and acrylonitrile in the presence of a seed latex using the following recipe in parts by weight:

| | |
|---|---|
| Isoprene | 60 |
| Acrylonitrile | 40 |
| Seed latex solids [1] | 50 |
| Water (total) | 130 |
| Daxad 11 [2] | 0.1 |
| Potassium oleate [3]—total | 4.2 |
| Sodium hydrosulfite | 0.02 |
| Potassium chloride | 0.4 |
| Trisodium phosphate | 0.4 |
| MTM [4] | 0.4 |
| Ferrous sulfoxylate complex [5] | 0.02 |
| Diisopropyl benzene hydroperoxide | 0.2 |
| Reaction temperature ° C | 13 |

[1] The seed latex was a 35.6% solids latex of isoprene-acrylonitrile copolymer containing 25% acrylonitrile.
[2] Daxad 11 is a trade name for a sodium salt of a condensation product of beta-naphthalene sulfonic acid with formaldehyde.
[3] 2.2 parts present in the seed latex and two increments of 1.0 part each were added at 15 and 30 percent conversion, respectively.
[4] Mixed tertiary $C_{12}$–$C_{16}$ mercaptans.
[5] A mixture of 0.002 part $FeSO_4 \cdot 7H_2O$, 0.008 part trisodium phosphate, 0.0025 ethylene dinitrilo tetraacetic acid and 0.008 sodium sulfoxylate.

The polymerization was carried in an agitated reactor to a monomer conversion of 85 percent. The latex was stopped with 0.02 parts of sodium dimethyl dithio carbamate, degassed, the unreacted monomers were removed by stripping and then the latex was concentrated to 53% solids. The average particle size of Latex B was 1135 angstroms as determined by electron microscope and the viscosity was 12 poise at 25° C. measured in Brookfield LVF viscometer using #3 spindle at 30 revolutions per minute.

Blend I made by mixing 70 parts by dry weight of Latex A and 30 parts by dry weight of Latex B had a solids level of 62.0 percent. Blend II which contained Latex A and Latex B mixed in the 80/20 proportion had a solids level of 63.5 percent. These blends were compounded using the following recipe expressed in parts of active material per 100 by weight of total latex solids:

| | |
|---|---|
| Zinc diethyl dithiocarbamate | 0.75 |
| Zinc salt of 2-mercaptobenzothiazole | 1.0 |
| Sulfur | 2.25 |
| 2,2 methylene bis(4-methyl 6-tert, butyl phenol) | 0.75 |
| Trimene base [1] | 0.8 |

[1] A trade name for a reaction product of ethyl chloride, formaldehyde and ammonia.

The above compounding ingredients added in the form of dispersions were intimately mixed with the latex blend and allowed to stand overnight (16 hours) at 25° C. in a covered vessel. The so matured compound having a viscosity of 7.4 poise and 59% solids was then whipped in an A–200 model Hobart mixer to about 10 times its volume to give a desired density of latex foam, of about 0.100 gram per cubic centimeter. The foamed compositions were then treated with 3.0 parts of zinc oxide, 0.05 part of Trimene base, and 1.9 parts of sodium silicofluoride, and further whipped for 2 minutes to disperse these additional ingredients. Next the above compositions were poured into a 20 cm. x 15 cm. x 2.5 cm. mould covered with lid, and allowed to get at room temperature in 6½ minutes. The mould containing gelled compositions was then placed in a curing bath maintained at 100° C. and cured for 25 minutes. Next the cured latex foams were removed from the mould, washed with water, dried at 82° C. for 1¾ hours and then tested in a conventional manner for physical properties. Samples of uncured wet gel were also tested for tensile strength.

Latex A was used as control. It was compounded in the same manner as the latex blends using the same compounding recipe except for higher amounts of sodium silicofluoride of 2.8 parts. The Latex A compound showed a gelling time of 7¼ minutes, that is, slightly longer than the blends. The results are presented in Table I.

TABLE I

| | Blend I | Blend II | Control |
|---|---|---|---|
| Foam density, gms./cm.$^3$ | 0.125 | 0.122 | 0.125 |
| Tensile strength of uncured wet gel foam, kg./cm.$^2$ | 0.12 | 0.092 | 0.088 |
| Tensile strength of cured foam, kg./cm.$^2$ | 0.73 | 0.65 | 0.55 |
| Elongation at break, percent | 213 | 184 | 131 |
| Oil resistance (sample soaked in Lubricating Oil): | | | |
| Compression set [1] percent | −7.1 | ([2]) | −19.2 |
| Oil swelling, percent | 18.5 | ([2]) | 22.5 |
| Oil pickup, percent | 592 | ([2]) | 787 |

[1] Relative decrease in thickness measured on foam samples which were compressed to 50% of the original thickness, held 72 hours at 100° C., and then relaxed 30 minutes at room temperature.
[2] Not tested.

Data of Table I indicate that Blend I was about 30% better in tensile strengths of uncured wet gel and cured foam, 60% better in elongation of cured foam than control. It was also significantly better in oil resistance. Blend II showed intermediate values. The appearance and texture of the foam rubbers shown in Table I were of a desirable and pleasing quality.

EXAMPLE II

A latex blend (Blend III) was prepared by admixing Latex A of Example I and Latex C in a ratio of 40:60, on dry weight basis.

Latex C was prepared by copolymerizing a mixture of 70 parts of isoprene and 30 parts of acrylonitrile in the presence of 63 parts of an isoprene-acrylonitrile seed latex containing 25 parts of dry weight material. The polymerization recipe was similar to that shown in Example I except that different proportions of isoprene, acrylonitrile and seed latex were used and the total amount of potassium oleate was 4 parts of which 3 parts were added as three increments of 1 part each at 15, 30 and 50% conversion, respectively. The latex was stopped at 88% conversion, degassed, stripped and then concentrated to 58% solids, in a disc type concentrator. The average particle size of Latex C was 1110 angstroms.

Blend III was compounded, foamed, gelled and cured to produce latex foam as in Example I. The foam was tested and results are shown in Table II.

TABLE II

| | |
|---|---|
| Foam density (gms./cm.$^3$) | 0.100 |
| Tensile strength (kg./cm.$^2$): | |
| Of uncured wet gel | 0.11 |
| Of cured foam | 0.72 |
| Elongation of cured foam (percent) | 256 |
| Resistance to lubricating oil: | |
| Swelling (percent) | 12.5 |
| Oil pick-up (percent) | 443 |

The above results indicate that the latex foam prepared from Blend III had improved wet gel strength as well as good tensile strength and elongation when cured. It also had very good resistance to lubricating oil.

Cured foam sample was also tested for resistance to ageing in air at 100° C. and compared to the control sample of Example I. The results are presented in Table III.

TABLE III

| | Change in samples aged for 22 hours relative to values of unaged samples, percent | |
|---|---|---|
| | Blend | Control |
| Tensile strength | +5 | −14 |
| Elongation | −8 | −30 |

Table III shows that the foam made from the blend of latices is more resistant to air ageing at elevated temperature than the control foam made from the styrene-butadiene rubber latex alone.

EXAMPLE III

A latex blend (Blend IV) was prepared by admixing Latex C of Example II and a high modulus styrene-butadiene latex in a proportion of 30:70 on dry weight basis.

The high modulus styrene butadiene latex was prepared by blending the unagglomerated and unconcentrated Latex A of Example I with polystyrene latex in a proportion of 9:1 on dry weight basis, followed by freeze-thaw agglomeration and concentration to 65% solids.

Blend IV was compounded, foamed, gelled and cured to give latex foam as described in Example I. For comparison, a latex foam was also made from the high modulus styrene-butadiene latex alone. These two foam specimens were tested and the results are shown in Table IV.

TABLE IV

| Physical properties of cured foam | Blend IV | Control High Modulus SBR |
|---|---|---|
| Tensile strength, kg./cm.$^2$ | 0.70 | 0.56 |
| Elongation, percent | 209 | 146 |

The above table shows that the blend produced a latex foam which was markedly stronger than the foam produced from the high modulus styrene-butadiene (SBR) latex.

EXAMPLE IV

A latex foam was prepared from a blend of Natural Latex (NR) and Latex B of Example I. The latices were blended in a proportion of 70:30 on dry weight basis, of NR:Latex B, and the blend was stabilized with 1.5 parts of potassium oleate and 0.1 part of ammonium caseinate. The blend was compounded using the recipe of Example I, then foamed, gelled and cured as described in Example I. For comparison, a control sample of foam was produced in the same manner from natural latex. The compounding recipe for the control was slightly modified in that Trimene base and sodium silicofluoride were reduced, 0.4 part and 0.8 part respectively. Physical test data for the above foam samples are presented in Table V.

| Physical properties | 70/30 blend NR/Latex B | Control (NR Latex) |
|---|---|---|
| Tensile strength, kg./cm.$^2$: | | |
|   Of uncured wet gel | 0.105 | 0.08 |
|   Of cured foam | 0.77 | 0.95 |
| Elongation of cured foam, percent | 315 | 330 |
| Relative change in properties in foam samples aged in air at 100° C. for 22 hours | | |
| Tensile strength, percent | +1.4 | −39 |
| Elongation, percent | −42 | −55 |

The data in Table V indicate that the physical properties of the foam made from the above blend are essentially as good as those of the control while the resistance to hot air ageing is noticeably improved.

EXAMPLE V

Blend III was used for the preparation of cast film. The blend was compounded using the following recipe in parts by weight of dry or active substance per 100 parts by weight of dry substance:

| | |
|---|---|
| Ammonium caseinate | 0.15 |
| Ammonium hydroxide | 1.0 |
| Zinc oxide | 3.0 |
| Zinc diethyl dithiocarbamate | 0.75 |
| Zinc salt of 2-mercaptobenzothiazole | 1.0 |
| Sulfur | 2.25 |
| 2,2-methylene-bis (4-methyl-6 tert. butyl phenol) | 0.75 |

The ingredients were added in the form of aqueous dispersions and mixed thoroughly with the latex. The mixture was stored overnight at 25° C. in a closed container and then poured onto level tray to a thickness of about 2.5 mm. The tray was kept in a room maintained at 25° C. and 50% humidity. As the water evaporated a clear rubbery film was formed. After 10 hours of drying the film was removed from the tray and part of it was tested for stress-strain properties, while the rest was heated at 120° C. for 20 minutes to complete drying and curing. The film used for the above testing was about 0.5 mm. thick. Another film having a thickness of 1.5 mm. was prepared in a similar manner for swelling measurements. Films were prepared also from Latex A compounded in the recipe as shown above, and used as control. The results are shown in Table VI.

TABLE VI

| Film properties | Blend III | Latex A control |
|---|---|---|
| Tensile strength, kg./cm.$^2$: | | |
|   Before heating at 120° C | 48 | 45 |
|   After heating | 44 | 34 |
| Elongation, percent: | | |
|   Before heating | 745 | 720 |
|   After heating | 580 | 410 |
| 300% modulus, kg./cm.$^2$: | | |
|   Before heating | 8.8 | 14.4 |
|   After heating | 10.9 | 12.7 |
|   Appearance | (¹) | (¹) |
| Longitudinal swelling,$^2$ percent: | | |
|   In ASTM fuel A | 37 | 73 |
|   In ASTM fuel B | 95 | 172 |
|   In ASTM oil No. 1 | 8 | 24 |
|   In ASTM oil No. 3 | 91 | 131 |

¹ Good.
² Measured on 10 cm. x 0.2 cm. strip immersed in swelling liquid for 7 days at 25° C.

The above table shows that films prepared from Blend III are rubbery, have relatively good stress-strain properties and markedly improved resistance to swelling liquids.

A latex film was also prepared by dipping technique in the following manner. A polytetrafluoro ethylene plate was dipped into the compounded latex blend, as described above, and then into a coagulant solution consisting of 20% acetic acid, 0.2% octyl alcohol and 79.8% water. The resulting wet gel film was fairly coherent and had a tensile strength of 2.0 kg./cm.$^2$.

We claim:

1. A process of producing shaped elastic compositions which comprises blending (1) a latex of a rubbery hydrocarbon polymer, said latex (1) having a solids content of at least 60% by weight, and (2) a latex of a copolymer of a mixture of monomers comprising isoprene and a nitrile of an acrylic acid containing from 3 to 6 carbon atoms, the molar proportion of isoprene to said nitrile being from 5:1 to 1:1, said latex (2) having a solids content of at least 50% by weight, shaping the blend of (1) and (2) to a predetermined form, gelling to preserve said form, and vulcanizing the shaped, gelled, form.

2. The process according to claim 1 in which the blend is compounded with a gelling agent, whipped to produce a foam, the foam is gelled in a mould of a desired form and said gelled foam is vulcanized whereby an improved rubber elastic foam is produced.

3. A process according to claim 1, wherein the latex of a rubbery hydrocarbon polymer is a latex of a polymer of an aliphatic conjugated diene.

4. The process according to claim 3 wherein the latex of rubbery hydrocarbon polymer is selected from the group consisting of a natural rubber latex and a latex of a synthetic styrene-butadiene copolymer containing less than 50% by weight of styrene.

5. A process according to claim 1, wherein the latex (2) is a latex of a copolymer of isoprene and acrylonitrile.

6. A process according to claim 5, wherein the latex (2) is a latex of a copolymer of isoprene and acrylonitrile containing from 30 to 45 mole percent of acrylonitrile.

7. A process according to claim 1, wherein the blend of latex (1) and latex (2) has a solids content of at least 58% by weight.

8. A process according to claim 7, wherein the latex of the copolymer of isoprene and acrylonitrile is a latex produced in an emulsion polymerization system in the presence of a seed latex.

9. A process according to claim 1 wherein the latex blend comprises from 90 to 40 parts by weight of latex (1) and 10 to 60 parts by weight of latex (2).

10. A process according to claim 1 wherein the blend is deposited on a support having a predetermined shape, gelled by dipping said support in a coagulant and vulcanized.

11. A process of producing shaped elastic compositions which comprises blending (1) a latex of a rubbery polymer of an aliphatic conjugated diene, said latex (1) having a solids content of at least 60% by weight, and (2) a latex of a copolymer of isoprene and acrylonitrile containing from 25 to 50 mole percent of acrylonitrile, said latex (2) having a solids content of at least 50% by weight and the blend of latex (1) and latex (2) having a solids content of at least 58% by weight, shaping the blend of (1) and (2) to a predetermined form, gelling to preserve said form, and vulcanizing the shaped, gelled form.

12. A process according to claim 11 wherein the latex blend comprises from 90 to 40 parts by weight of latex (1) and 10 to 60 parts by weight of latex (2).

13. The process according to claim 11, wherein the latex of rubbery hydrocarbon polymer is selected from the group consisting of a natural rubber latex and a latex of a synthetic styrene-butadiene copolymer containing less than 50% by weight of styrene.

14. A process according to claim 11, wherein the latex (2) is a latex of a copolymer of isoprene and acrylonitrile containing from 30 to 45 mole percent of acrylonitrile.

15. A shaped elastic composition comprising a gelled and vulcanized product of a latex blend of (1) a latex of a rubbery hydrocarbon polymer having a solids content of at least 60% by weight and (2) a latex of a copolymer of a mixture of monomers comprising isoprene and a nitrile of an acrylic acid containing from 3 to 6 carbon atoms, the molar proportion of isoprene to said nitrile being from 5:1 to 1:1, said latex (2) having a solids content of at least 50% by weight.

16. A shaped elastic composition as claimed in claim 15 comprising a latex blend of (1) a latex of a rubbery polymer of at least 60% by weight, and (2) a latex of a copolymer of isoprene and acrylonitrile containing from 25 to 50 mole percent of acrylonitrile, said latex (2) having a solids content of at least 50% by weight and the blend of (1) and (2) having a solids content of at least 58% by weight.

17. A shaped composition as claimed in claim 15 in the form of a foam having a density of about 0.05 to 0.3 gram per cc.

18. A shaped elastic composition as claimed in claim 15 wherein said latex (1) is selected from the group consisting of a natural rubber latex and a latex of a synthetic styrene-butadiene copolymer containing less than 50% by weight of styrene.

References Cited

UNITED STATES PATENTS 2,643,233  6/1953  Bennett et al.

MURRAY TILLMAN, Primary Examiner

M. FOELAK, Assistant Examiner

U.S. Cl. X.R.

260—29.7, 894